(12) United States Patent
Lefebvre et al.

(10) Patent No.: US 11,821,361 B1
(45) Date of Patent: Nov. 21, 2023

(54) GAS TURBINE INTAKE FOR AIRCRAFT ENGINE AND METHOD OF INSPECTION THEREOF

(71) Applicant: PRATT & WHITNEY CANADA CORP., Longueuil (CA)

(72) Inventors: Guy Lefebvre, St-Bruno-de-Montarville (CA); Christopher Gover, Longueuil (CA); Remy Synnott, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/858,289

(22) Filed: Jul. 6, 2022

(51) Int. Cl.
*F02C 7/04* (2006.01)
*F01D 9/06* (2006.01)

(52) U.S. Cl.
CPC ............... *F02C 7/04* (2013.01); *F01D 9/065* (2013.01); *F05D 2220/32* (2013.01); *F05D 2230/72* (2013.01); *F05D 2240/127* (2013.01)

(58) Field of Classification Search
CPC ...... F02C 7/04; F02C 6/18; F02C 6/00; F01D 9/026; F04D 29/403; F04D 29/30
See application file for complete search history.

(56) References Cited

U.S. PATENT DOCUMENTS

| | | | |
|---|---|---|---|
| 2,385,366 A * | 9/1945 | Lysholm | F02C 3/055 60/248 |
| 2,801,043 A | 7/1957 | Spotz et al. | |
| 3,396,906 A * | 8/1968 | Newton | F04D 29/403 415/204 |
| 4,996,839 A * | 3/1991 | Wilkinson | F02C 6/12 60/605.1 |
| 5,145,215 A | 9/1992 | Udell | |
| 6,783,321 B2 | 8/2004 | Lathrop et al. | |
| 7,074,009 B2 | 7/2006 | Allmang et al. | |
| 7,147,433 B2 * | 12/2006 | Ghizawi | F01D 5/141 416/185 |
| 9,328,738 B2 | 5/2016 | Yokoyama et al. | |
| 9,835,165 B2 * | 12/2017 | Jinnai | F04D 29/403 |

(Continued)

FOREIGN PATENT DOCUMENTS

| | | |
|---|---|---|
| CN | 107725195 | 2/2019 |
| DE | 19936170 | 2/2001 |
| GB | 571022 | 8/1945 |

*Primary Examiner* — Thuyhang N Nguyen
(74) *Attorney, Agent, or Firm* — Norton Rose Fulbright Canada LLP

(57) ABSTRACT

The gas turbine intake can have a swirl housing assembly with a tangential inlet fluidly connecting an exhaust conduit, an annular outlet defined around a central axis and fluidly connecting a turbine gas path, a swirl path extending around the central axis and between the tangential inlet and the annular outlet, the swirl housing assembly having a proximal portion defining a first portion of the swirl path, a distal portion defining a second portion of the swirl path, vanes located in the swirl housing assembly, the vanes circumferentially interspaced from one another relative the central axis and extending between the proximal portion and the distal portion, the proximal portion fastened to the distal portion via a plurality of fasteners, a gasket sandwiched between the proximal portion and the distal portion by the plurality of fasteners, the gasket extending in a radial plane relative the central axis.

7 Claims, 7 Drawing Sheets

(56) References Cited

U.S. PATENT DOCUMENTS

| | | |
|---|---|---|
| 10,030,581 B2 | 7/2018 | Gekht et al. |
| 10,428,986 B2 | 10/2019 | Yeandel |
| 2014/0212277 A1* | 7/2014 | Uesugi .................... F01D 25/14 |
| | | 415/151 |
| 2015/0056065 A1* | 2/2015 | Takama .................. F01D 25/24 |
| | | 415/119 |

* cited by examiner

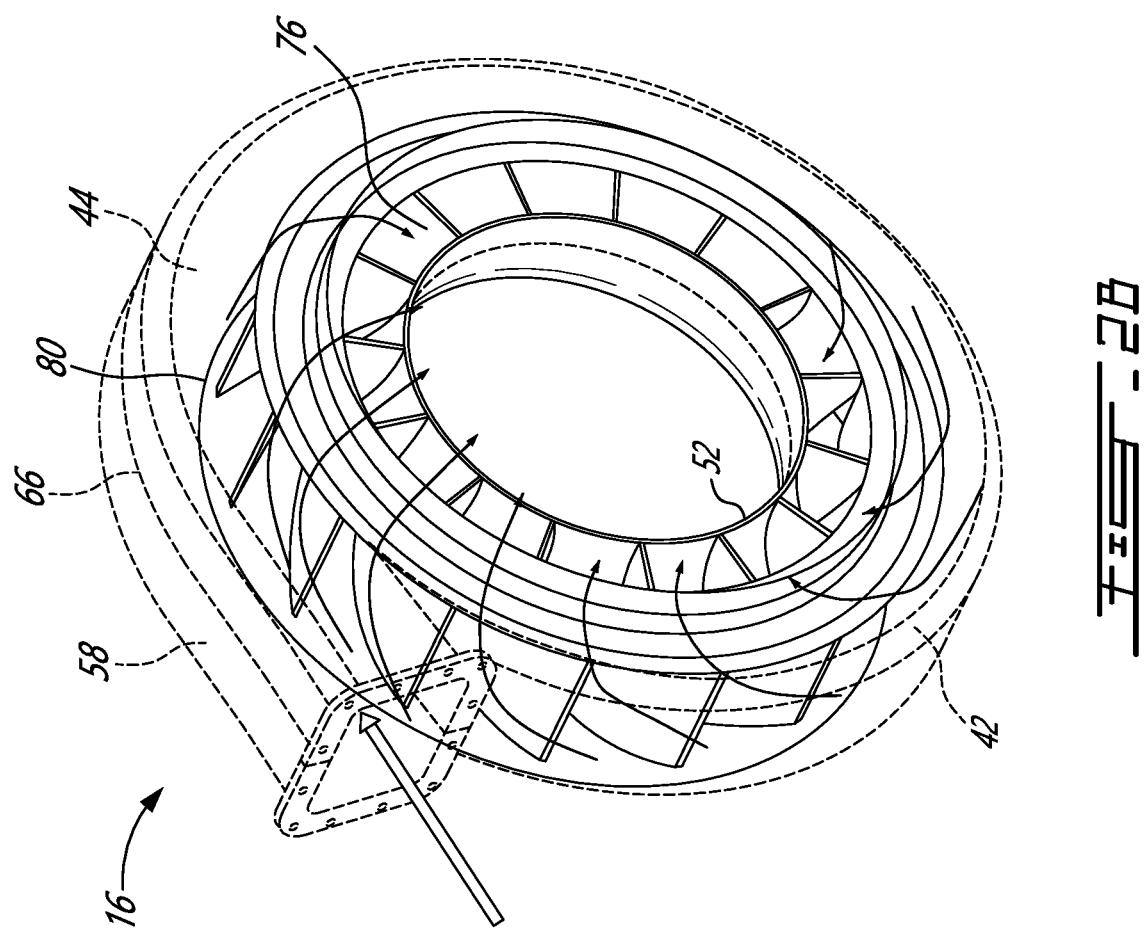

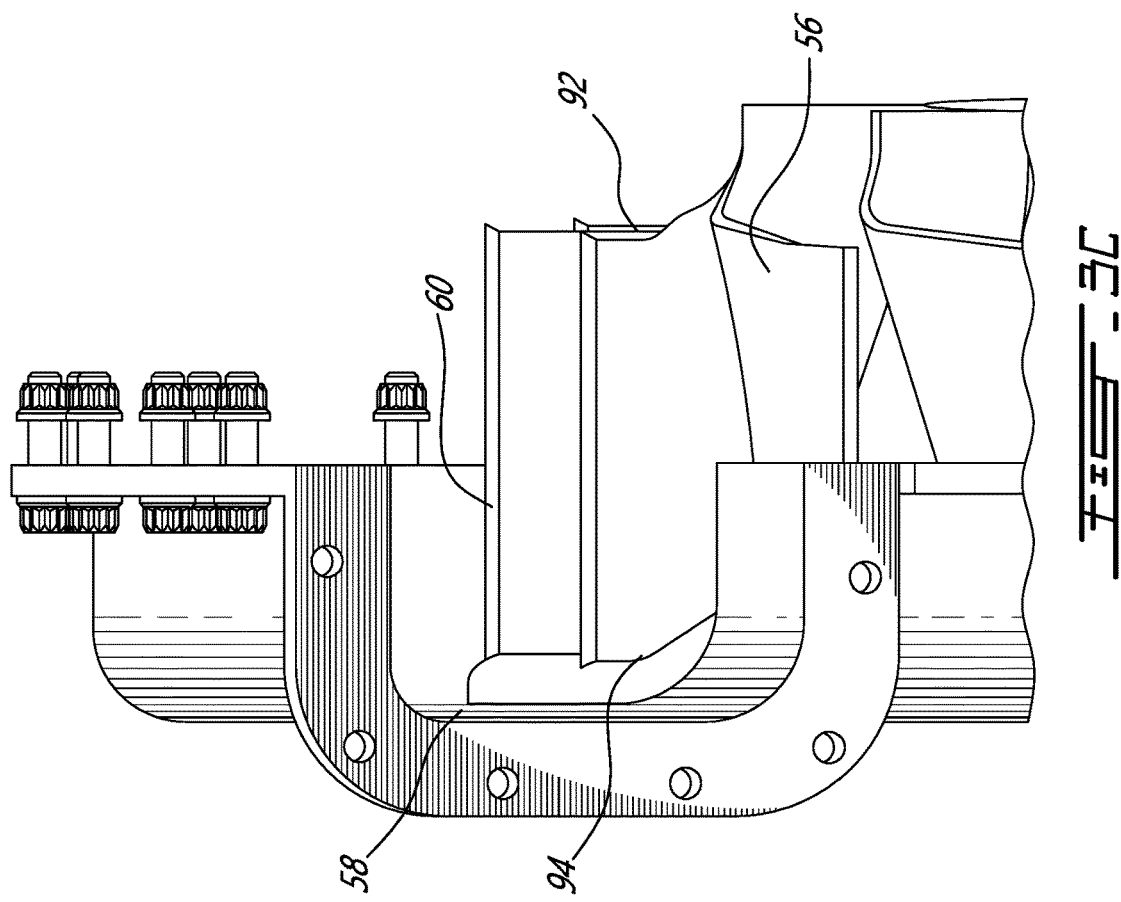
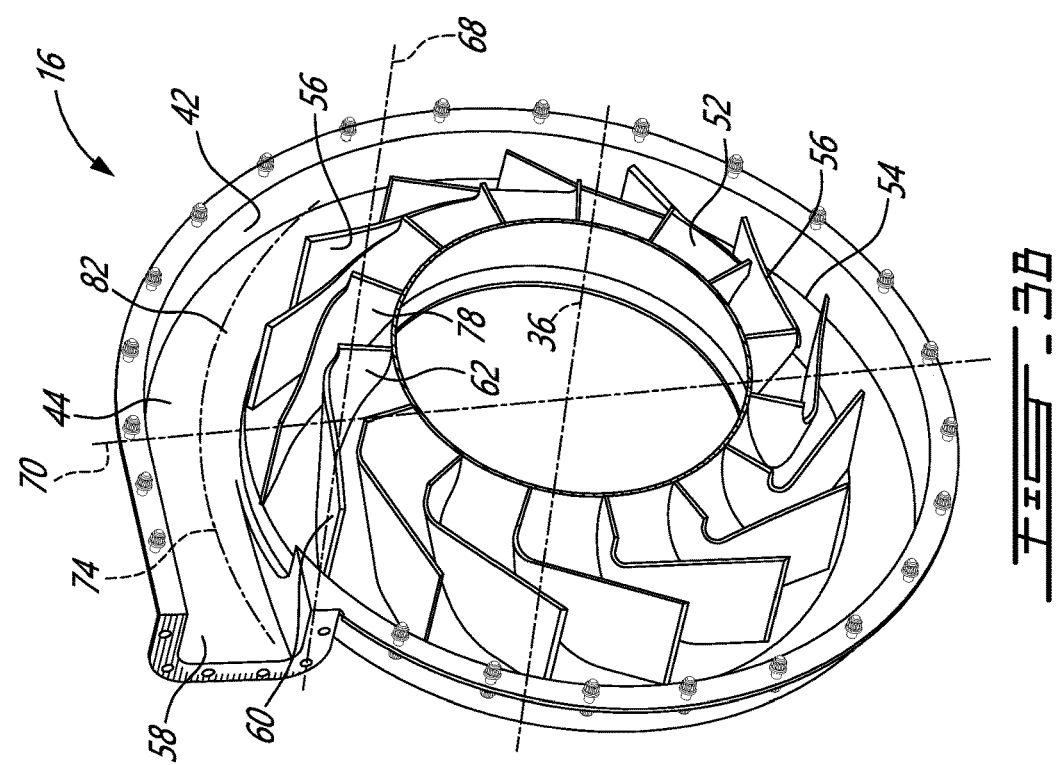

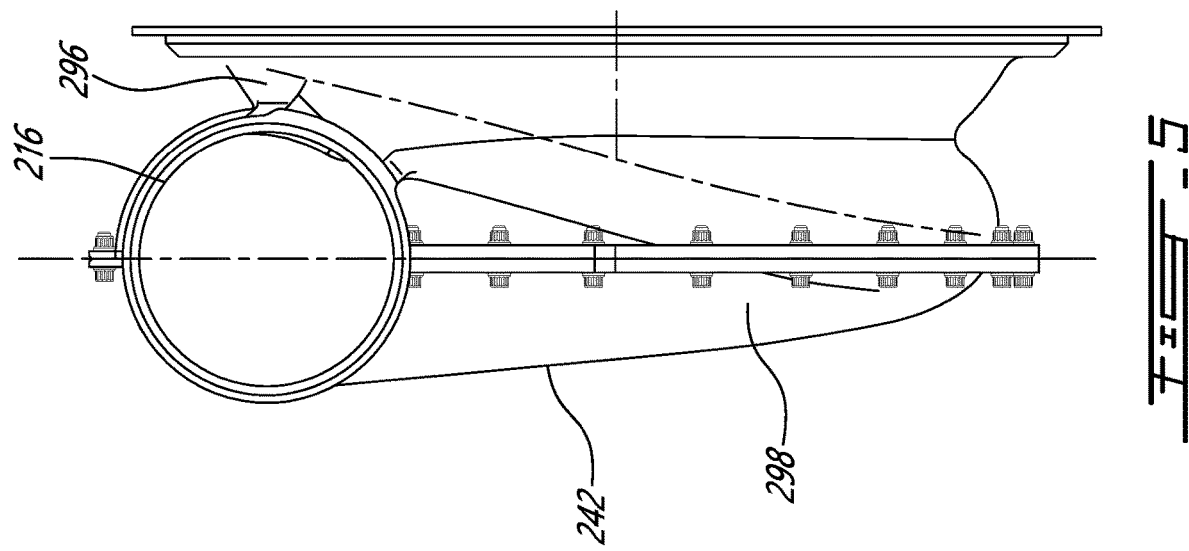

_US 11,821,361 B1_

GAS TURBINE INTAKE FOR AIRCRAFT ENGINE AND METHOD OF INSPECTION THEREOF

TECHNICAL FIELD

The application relates generally to gas turbine engines and, more particularly, to a gas turbine intake thereof.

BACKGROUND OF THE ART

A gas turbine typically has an annular flow path. The annular flow path may extend axially across one or more alternating sets of stator vanes and rotary blades. In some gas turbine engines, the gas path extends annularly and in sequence across one or more compressor stages and a combustor upstream of one or more turbine stages, and the gas turbine in the form of the one or more turbine stages may readily receive an annular flow of hot gasses from the combustor. In some other embodiments, the source of hot exhaust gasses may not be readily available in an annular configuration, and a challenge can exist in transitioning the hot exhaust gas flow from its source configuration to an annular configuration. Such challenges can be amplified when taking additional factors into consideration such as limiting aerodynamic losses, limiting weight, limiting manufacturing costs, maintenance and inspection, etc. There always remains room for improvement.

SUMMARY

In one aspect, there is provided an aircraft engine comprising: an exhaust conduit; at least one combustion engine having an exhaust gas outlet fluidly connected to the exhaust conduit; at least one gas turbine having a casing defining a radially outer limit of an annular gas path extending along and around a central axis, and at least one rotor having a shaft concentric to the central axis, a plurality of blades circumferentially interspaced from one another around the central axis and protruding from the shaft across the annular gas path; and a swirl housing assembly defining an intake to the gas turbine, the swirl housing assembly having a tangential inlet fluidly connecting the exhaust conduit, an annular outlet fluidly connecting the annular gas path, a swirl path extending around the central axis and between the tangential inlet and the annular outlet, the swirl housing assembly having a proximal portion defining a first portion of the swirl path, a distal portion defining a second portion of the swirl path, the proximal portion fastened to the distal portion via a plurality of fasteners, a gasket sandwiched between the proximal portion and the distal portion by the plurality of fasteners, the gasket extending in a radial plane relative the central axis, the proximal portion unfastenable from and separable from the distal portion to provide access to the swirl path.

In another aspect, there is provided a gas turbine intake comprising a swirl housing assembly having a tangential inlet fluidly connecting an exhaust conduit, an annular outlet defined around a central axis and fluidly connecting a turbine gas path, a swirl path extending around the central axis and between the tangential inlet and the annular outlet, the swirl housing assembly having a proximal portion defining a first portion of the swirl path, a distal portion defining a second portion of the swirl path, vanes located in the swirl housing assembly, the vanes circumferentially interspaced from one another relative the central axis and extending between the proximal portion and the distal portion, the proximal portion fastened to the distal portion via a plurality of fasteners, a gasket sandwiched between the proximal portion and the distal portion by the plurality of fasteners, the gasket extending in a radial plane relative the central axis, the proximal portion unfastenable from and separable from the distal portion to provide access to the vanes.

In a further aspect, there is provided a method of inspecting a gas turbine intake having a swirl housing assembly, the method comprising: unfastening a proximal portion of the swirl housing assembly from a distal portion of the swirl housing assembly; separating the proximal portion of the swirl housing assembly from the distal portion of the swirl housing assembly; and inspecting a plurality of vanes of the swirl housing assembly via an access stemming from said separating.

DESCRIPTION OF THE DRAWINGS

Reference is now made to the accompanying figures in which:

FIG. 2B is a schematic oblique view of a gas turbine intake taken from a proximal side;

FIG. 3A-3C are a collection of views of a gas turbine intake in accordance with a first embodiment, including an exploded view from a distal side, an oblique view of a distal portion thereof from a proximal side, and a tangential view of the distal portion;

FIG. 5 is a side elevation view of a gas turbine intake in accordance with a third embodiment.

DETAILED DESCRIPTION

Figure 1:
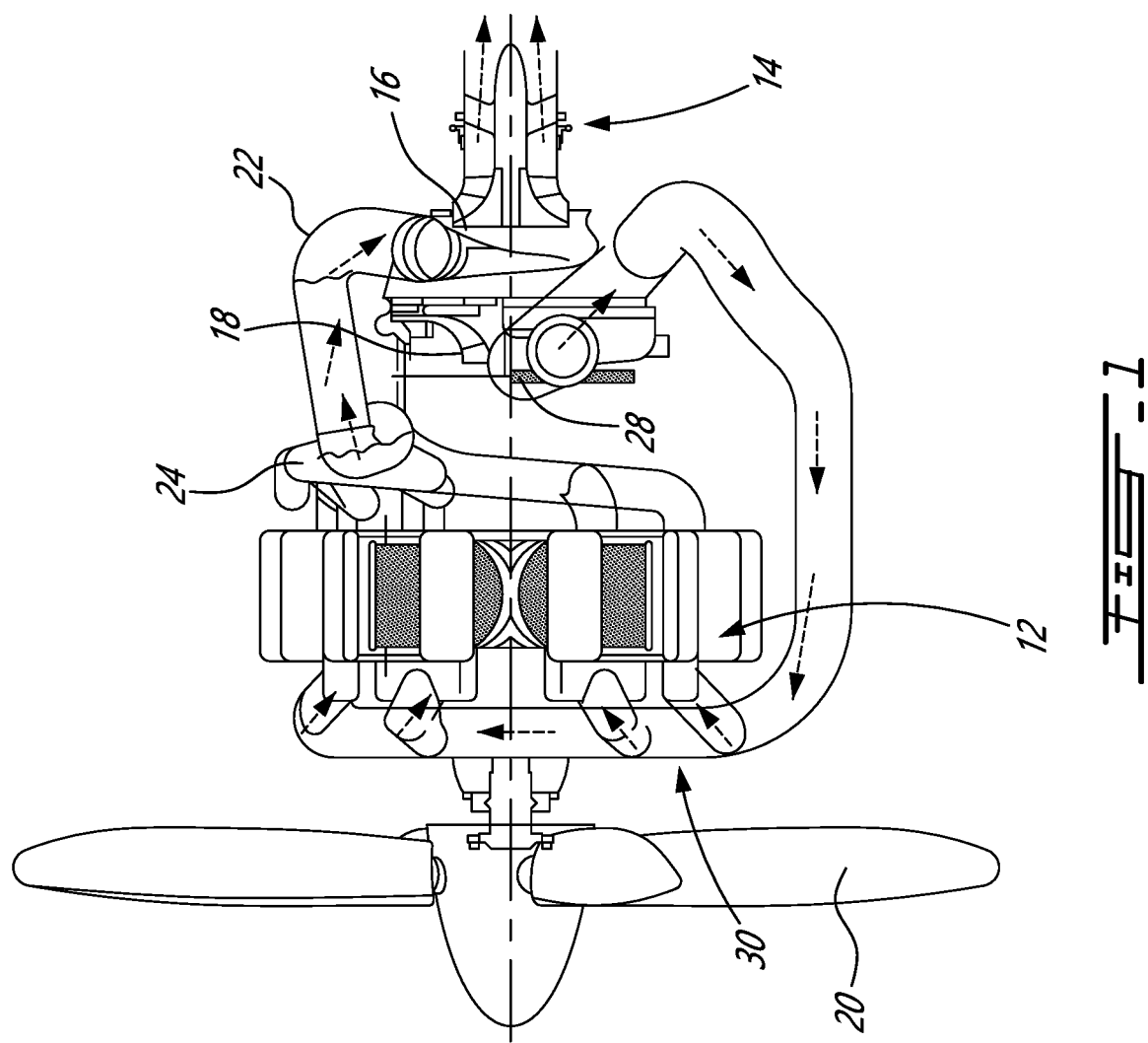
FIG. 1 is a schematic cross-sectional view of a gas turbine engine.

FIG. 1 illustrates an aircraft engine 10 of a type preferably provided for use in subsonic flight, generally comprising a combustion engine 12 in which compressed air is mixed with fuel and ignited delivering power and exhaust gasses. The exhaust gasses are collected from the combustion engine 12 and directed to a gas turbine 14. The gas turbine 14 can convert energy in the form of heat, pressure and/or velocity of the exhaust gasses into angular velocity of a rotor 15, and the rotor 15 can be used to direct power to one or more other device, such as a compressor 18, a propulsor 20 (e.g. propeller, fan), and/or an electric machine acting as a generator. The transfer of power can be direct, or via a clutch and/or a gearbox.

In the illustrated embodiment, the combustion engine 12 can have one or more combustion engine units such as piston engine units, and/or Wankel engine units for instance. The exhaust gasses can be collected from one or more exhaust gas outlet of the combustion engine 12 via an exhaust conduit 22 such as an exhaust pipe, optionally via an exhaust manifold 24 which connects an exhaust pipe to individual engine units. The exhaust conduit 22 can be straight, continuously curved, or made of straight sections interconnected via one or more elbows, to name some examples. The exhaust conduit 22 can provide a linear flow of exhaust gasses, whereas the gas turbine 14 can be configured for receiving an annular stream of exhaust gasses. A gas turbine intake 16 can be provided for connecting the exhaust conduit 22 to the gas turbine 14. The gas turbine intake 26 can be configured for receiving the linear flow of exhaust gasses from the exhaust conduit 22, distributing it circumferentially, re-orienting its velocity from a circumferential to an axial orientation, and feeding it as an axially-oriented annular stream to the gas turbine 14, as will be seen more clearly in FIG. 2.

In this embodiment, a compressor 18 is provided. The compressor 18 can be a centrifugal compressor for instance, and be used to boost the pressure of air from the environment in order to feed higher pressure air to the intake of the combustion engine 12. More specifically, compressed air can be collected from the compressor 18 by a compressed air pipe, such as via a helical scroll 28 for instance, and fed to the combustion engine 12, optionally via an intake manifold 30. The compressor 18 can be powered by the gas turbine 14, by the combustion engine 12, and/or by an auxiliary electric engine, to name some examples. The compressor 18 is optional.

Figure 2A:
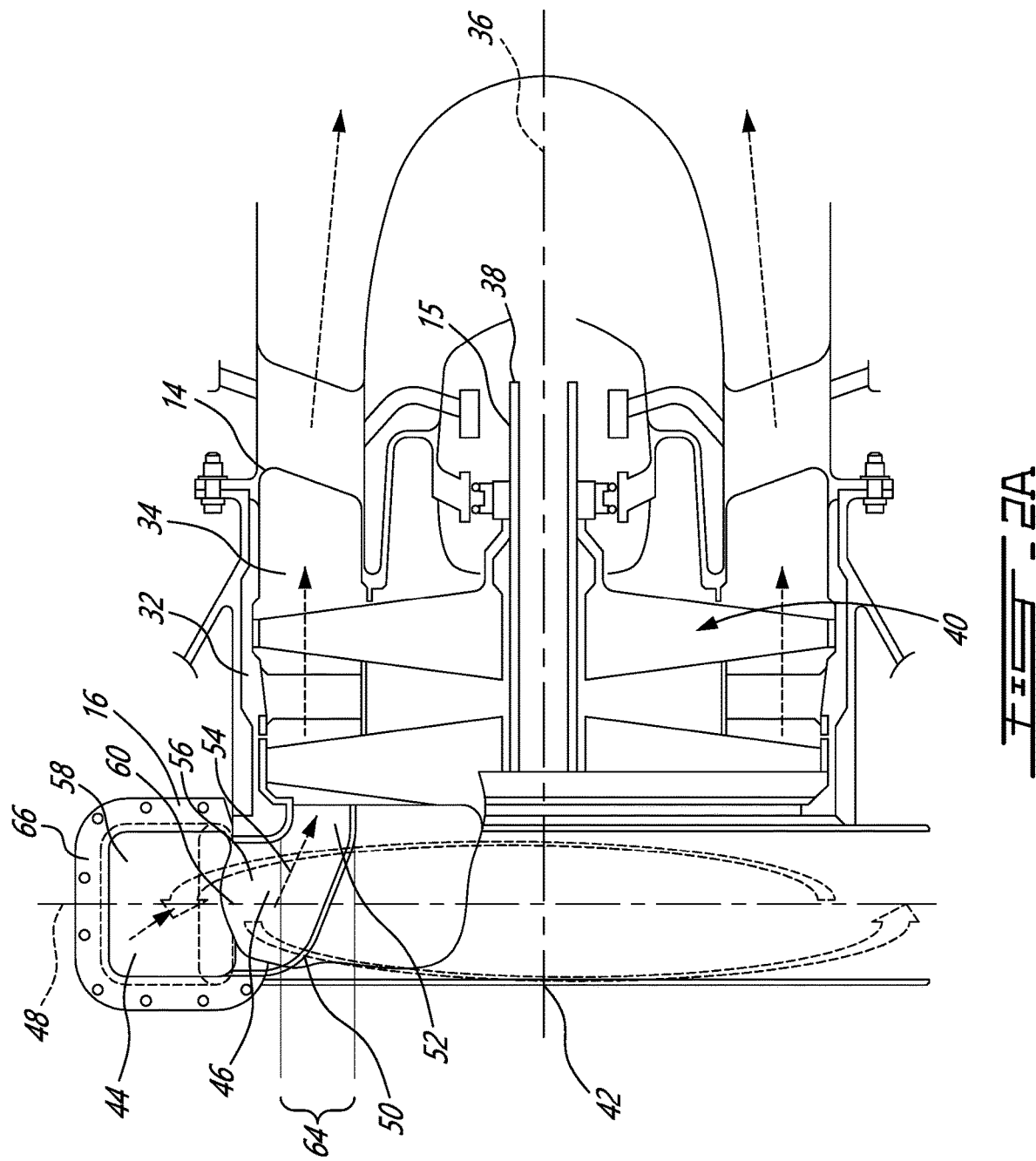
FIG. 2A is a cross-sectional view, enlarged, of a portion of the gas turbine engine of FIG. 1.

FIG. 2A presents a sectioned, enlarged view of an example gas turbine intake 16 coupled to a gas turbine 14. In this example, the gas turbine 14 has a casing 32 defining a radially outer limit of an annular gas path 34 extending along and around a central axis 36, and a rotor 15 having a shaft 38 concentric to the central axis 36. The rotor 15 has a plurality of blades 40, and more specifically in this embodiment an axial sequence of two sets of blades. The blades 40 of each set are circumferentially interspaced from one another around the central axis 36, and the two sets are axially separated from one another by a set of vanes. The blades 40 protrude radially from the shaft 38 across the annular gas path 34. The blades 40 rotate in a plane or in a conical virtual surface, and the gas travels across the blades 40 generally perpendicular to the orientation of the length of the blades 40. The vanes are made integral to the casing 32 and are thus non-rotary by contrast with the blades 40. In this example, the radially internal limit of the annular gas path 34 is defined in part by a hub of the vanes, and the vanes protrude radially internally from the outer portion of the casing 32 to the hub. Alternate embodiments can have additional sets of blades, additional sets of vanes, or both additional sets of vanes and blades. Moreover, alternate embodiments of a gas turbine can have blades forming a radial to axial transition. While the annular gas path 34 can be said to extend generally axially along the gas turbine 14, it will be understood that in some embodiments, the gas path 34 can extend obliquely or in a curved manner, such as having both conical and cylindrical portions for instance. In some embodiments, it can be preferred to have a set of vanes immediately upstream the first (or only) set of blades, for controlling the swirl in the flow, and/or controlling the angle of attack of the blades relative to the incoming flow of air, which may affect efficiency of energy transfer between the fluid and the blades as known to persons having ordinary skill in the art.

As seen in FIGS. 2A and 2B, in this embodiment, the gas turbine intake 16 has a swirl housing assembly 42 having a first, radially-outer internal portion thereof forming a swirl path 44. The swirl path 44 extends circumferentially around the central axis 36, and more specifically continuously around the central axis 36 in this embodiment. An inlet 58 can lead tangentially into the swirl path 44. The swirl housing assembly 42 has a second, radially-inner internal portion defining an annular elbow 46 between a radial orientation 48 and an axial orientation 50. The annular elbow 46 is provided radially inwardly of the swirl path 44, and fluidly connects the swirl path 44 to the annular outlet 52. As will be explained below, a plurality of vanes 56 can be provided in the annular elbow 46, the plurality of vanes 56 manifolding the swirl path 44 into a plurality of circumferentially interspaced guide paths 54, wherein each guide path 55 can scoop circumferentially circulating gasses from the swirl path 44 and aerodynamically redirect their circumferential velocity to radially inward velocity and to axial velocity. The redirection can be done aerodynamically in a manner to limit aerodynamic losses. The redirection can be performed in a manner to limit or otherwise control the occurrence of swirl at the annular outlet 52, and to otherwise direct the flow of gasses in a manner to optimize efficiency of the turbine 14.

The gas turbine intake 16, and in particular the swirl path 44, extend generally circumferentially, i.e. in a radially-extending plane 48. The annular outlet 52 of the gas turbine intake leads directly to the annular gas path 34 of the gas turbine 14, i.e. not via a combustor or compressor.

Figure 3A:
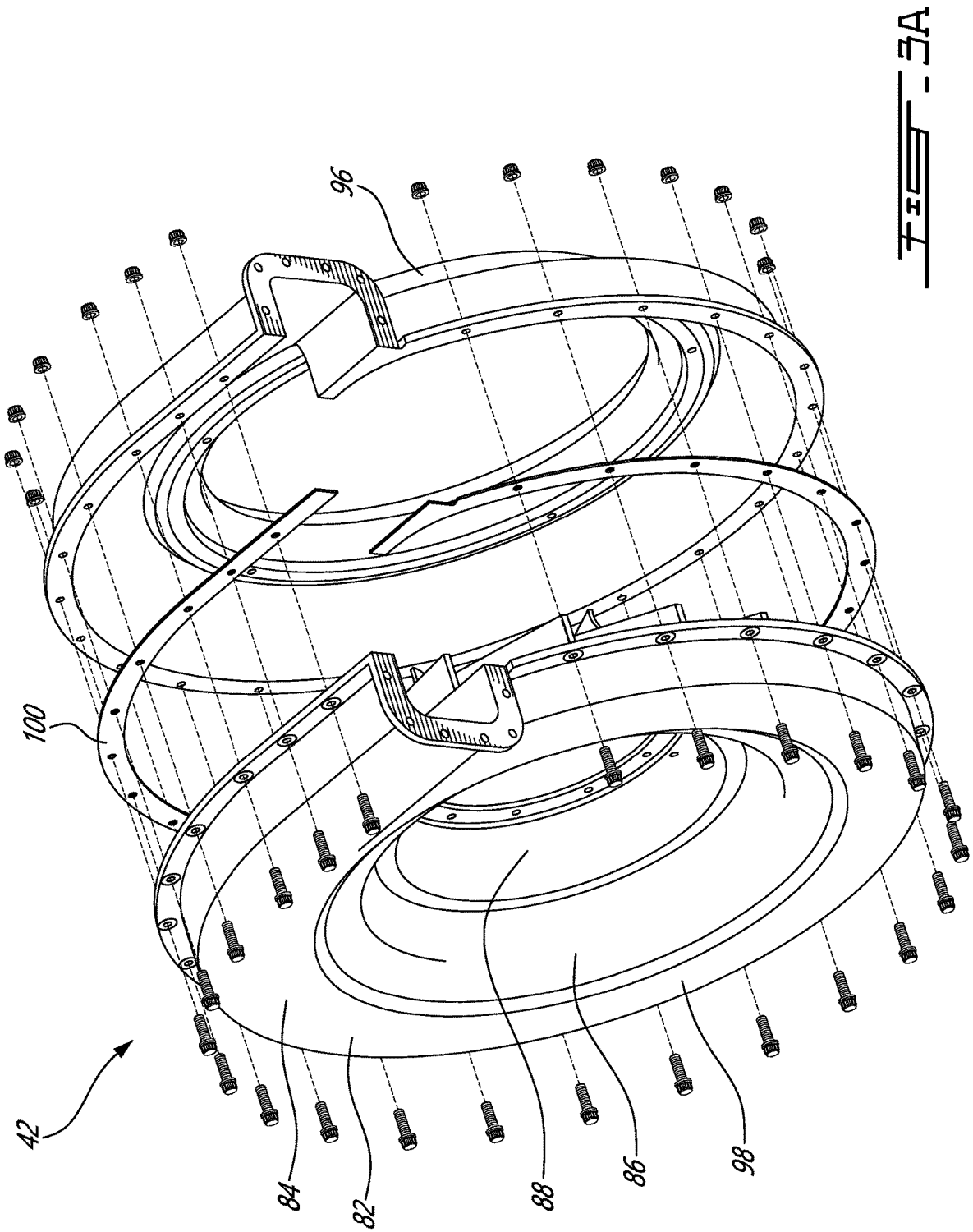

FIGS. 3A to 3C present an example embodiment of a swirl housing assembly 42 in greater detail. In this example, the swirl housing assembly 42 is made of two portions which can be separated from one another along a joint which extends here in a radial plane. The two portions can be referred to as a proximal portion 96 and as a distal portion 98, respectively. The proximal portion 96 has an internal recess forming a first portion of the swirl path 44, and more specifically here a first half of the swirl path cross-section area. The distal portion 98 has an internal recess forming a second portion of the swirl path 44, and more specifically here a second half of the swirl path cross-section area. The proximal portion 96 is fastened to the distal portion 98 at the joint via a plurality of fasteners. In this example, the fasteners are bolts which extend across corresponding flanges of the distal portion 98 and of the proximal portion 96 and the joint can be referred to as a bolted flange arrangement. In this embodiment, a gasket 100 is sandwiched between the proximal portion 96 and the distal portion 98. The gasket 100 can be held in the sandwiched configuration by the fasteners. When the proximal portion 96 is secured to the distal portion 98, the swirl path 44 extends in an uninterrupted manner, in the axial orientation, between the proximal portion 96 and the distal portion 98. In other words, it is open between the proximal portion 96 and the distal portion 98. In this embodiment, the gasket 100 is planar and extends in a radial plane, but it will be understood that in alternate embodiments the gasket can have a more complex shape and/or extend obliquely for instance.

As best seen in FIG. 3B, the swirl housing assembly 42 can include a plurality of vanes 56 located internally to the swirl housing assembly, e.g. adjacent the swirl path 44, and interspaced from one another around the central axis 36.

The proximal portion 96 is unfastenable from the distal portion 98 by removing the fasteners, and can then be separated from the distal portion 98 to provide a better access to the inside, e.g. a configuration such as shown in FIG. 3B. A posteriori, this can be useful, in particular, for allowing visual, or non-destructive testing, inspection of the vanes 56 for instance. A priori, this can be useful for allowing greater design or manufacturing ability to the swirl housing assembly 42, and can be particularly helpful in allowing to manufacture complex vane geometries. Indeed, instead of having to manufacture the vanes 56 internally to the swirl housing, a separable swirl housing assembly 42 can allow to manufacture the vanes 56 as an exposed portion of one of the two portions, such as by integral casting, soldering or machining, for instance, which can open the door to manufacturing techniques which would not be available if the vanes 56 were to be manufactured as an enclosed, internal component. Subsequently to the manufacturing of the component bearing the vanes 56, the vanes 56 can become enclosed upon fastening of the other portion.

Accordingly, each vane 56 can be permanently secured to a first one of the proximal portion 96 and of the distal portion 98 and extend, internally to the swirl housing assembly 42, towards the second one of the proximal portion 96 and of the distal portion 98. In other words, all of the vanes 56 can be secured (e.g. integrally cast) to the proximal portion 96 or to the distal portion 98 and extend towards the other, or some of the vanes 56 can be secured to the proximal portion 96 while the other ones of the vanes 56 can be secured to the distal portion 98. The gasket 100 can be helpful in providing an gas-tight seal in the context of a potentially high pressure and high temperature environment of a gas turbine intake 16. The gasket 100 can be made of a metal or of a composite material for instance.

In this embodiment, the swirl path 44 extends circumferentially and is confined to the radially extending plane, but it will be noted that other configurations are possible, and the swirl path 44 can be helical in an alternate embodiment for instance. In some cases, the vanes 56 can be absent from an embodiment. It will be also noted in this embodiment that the joint, and more specifically the gasket 100, is interrupted at the tangential inlet 58 and therefore forms an open shape rather than a closed shape in this embodiment. It can form a closed shape in an alternate embodiment. Moreover, more than one joint can be used, such as a radially outer joint and a radially inner joint.

FIG. 3B present greater details of an example embodiment having such a plurality of vanes 56. In this specific embodiment, the vanes 56 can extend from a leading end 60 configured for scooping circumferentially circulating gasses from the swirl path 44, to a trailing end 62 positioned in the annular outlet 52. The vanes 56 have a (generally) flat body which twists, including by being curved radially outwardly between the trailing end 62 and the leading end 60. As shown in FIG. 2A, the leading end 60 can protrude radially outwardly from a virtual axial projection 64 of the annular outlet 62. The swirl path 44 is located yet further radially outwardly than the leading end 60 and can be said to extend between a radially outer edge, or leading edge, of the leading end 60 and a radially outer wall 66.

The circumferential distribution of the vanes 56 can be seen more clearly, as well as the configuration where they are circumferentially interspaced from one another relative the central axis 36. Each vane 56 has a twisted and flat body which can be said to have a length extending between the trailing end 62 and the leading end 60. The leading end 60 is oriented mainly circumferentially and axially at the swirl path 44. More specifically, in this embodiment, the leading end 60 slopes radially inwardly from the tangential/circumferential orientation, for scooping gasses from the swirl path 44 and directing them radially inwardly towards the annular outlet 52. The trailing end 62 is oriented mainly axially and radially at the annular outlet 52. The flat body of the vane 56 is twisted along its length. More specifically, the flat body of the vane 56 can be said to be twisted around two axes. Firstly, as seen in the figure, the flat body of the vane can be said to be twisted around the central axis, such as more specifically around an axial axis 68 which is parallel to the central axis 36, as evidenced by the fact that the flat body can be seen to be bent around such an axis 68 between the leading end 60 and the trailing end 62, and that the trailing end 62 terminates radially inwardly relative the leading end 60. Secondly, as seen in the figure, the flat body of the vane 56 can be said to be twisted around a radial axis 70 perpendicular to the central axis 36, as evidenced by the fact that the flat body can be seen to be bent around such an axis 70 between the leading end 60 and the trailing end 62, and that the trailing end 62 terminates axially offset from the leading end 60. The twisting around both axes results in a flat body shape which curves relatively smoothly and aerodynamically between a leading edge 76 of the leading end 60 which can be perfectly axial for instance, and a trailing edge 78 of the trailing end 62 which can be perfectly radial for instance, while being circumferentially, radially, and axially offset from the leading edge 76, with the flat body extending smoothly and continuously, in a twisted manner between the trailing edge 78 and the leading edge 76.

The swirl housing assembly 42 can be said to have a number of generally annularly extending walls. For instance, the swirl housing assembly 42 can be said to have a radially outer wall 66 which can form a radially outer limit of the swirl path 44, an axially proximal wall 80, and an axially distal wall 82. The axially proximal wall 80 can be said to extend annularly and radially between the annular outlet 52 and the radially outer wall 66. The axially distal wall 82 can be said to extend annularly and include a curved portion 86 between a radially-extending portion 84 and an axially-extending portion 88, as best seen in FIG. 3A. More specifically, the radially-extending portion 84 can connect the radially outer wall 66, whereas the axially-extending portion 88 can have a proximal end forming a radially inner edge of the annular outlet 52, the radially outer edge of the annular outlet 52 being formed by a radially inner end of the axially proximal wall 80. The curved portion 86 can be reminiscent of the geometrical shape of a lower, radially-inner, quarter of a torus for example, and can be said to be a toroidally curved portion. The shape of the toroidally curved portion can be for instance a surface of revolution shape resulting from rotating a roughly 90° arc shape around a central axis.

The twisted guide paths 54 can be said to be defined as each extending circumferentially between two adjacent ones of the vanes 56, and between the axially distal wall 82 and the axially proximal wall 80. The twisted guide paths 54 can twist first around an axial axis 68 and then around a radial axis 70 (from the leading end 60 to the trailing end 62). In particular, the curved portion 86 of the axially distal wall 82 can provide for an aerodynamically smooth transition between the radial velocity orientation and the axial velocity orientation. More specifically, an axially proximal edge 92 of the flat body of each vane 56 can join the axially proximal wall 80, and an axially distal edge 84 of the flat body of each vane 56 can join the axially distal wall 82, with corresponding portions of the axially proximal wall 80 and of the axially distal wall 82, and corresponding vanes, forming corresponding walls of each guide path 54. The axially distal edge 94 can be significantly longer in spatial dimension than the axially proximal edge 92, as a result of the twisting of the flat body around the axes. It will be noted in this embodiment in particular that the axially distal edge 94 of the vane body can continuously follow the curved portion 86 of the axially distal wall 82 of the swirl housing assembly 42. In this embodiment, the axially distal edge 94 does so by first extending generally circumferentially, with some degree of radially inward slope, and then gradually curving out axially inwardly, until reaching a generally axial orientation at the trailing end 62 where some degree of slope relative to an axial/tangential plane can be provided in a manner to optimize the orientation of the flow relative the gas turbine 14. A similar configuration can occur at the axially proximal edge 92, and a radially inner end of the axially proximal wall 80 can be similarly curved, though it can be less pronounced as a result of the fact that the radius of curvature can be significantly smaller at the axially proximal wall 80 than at the axially distal wall 82, given the general radial to axial transition geometry.

FIG. 3C presents a tangentially oriented, close-up view, of the leading end 60 of some of the vanes 56, through the inlet 58, providing an additional point of view of the geometry of the vanes 56 in accordance with an embodiment.

Figure 4B:
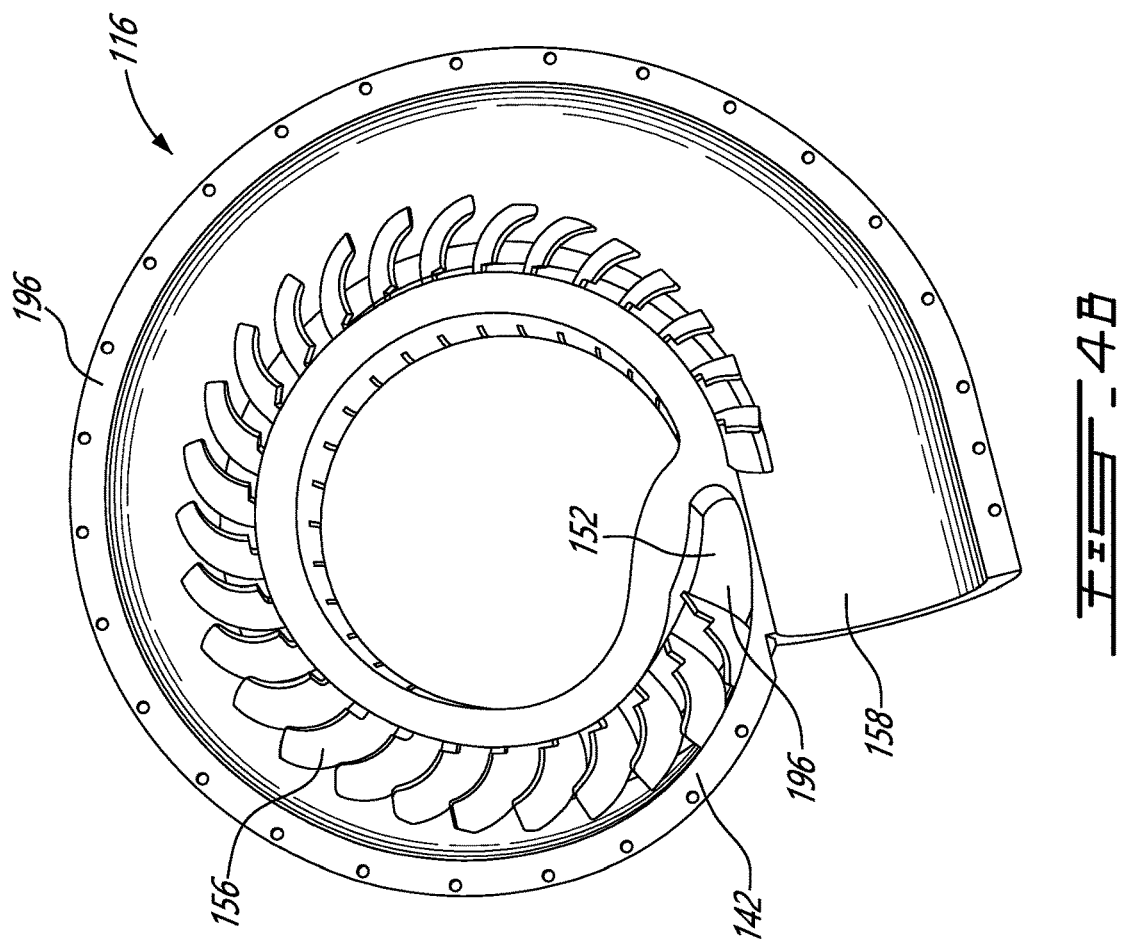
FIG. 4B is a front elevation view of a proximal portion the gas turbine intake of FIG. 4A.
Figure 4A:
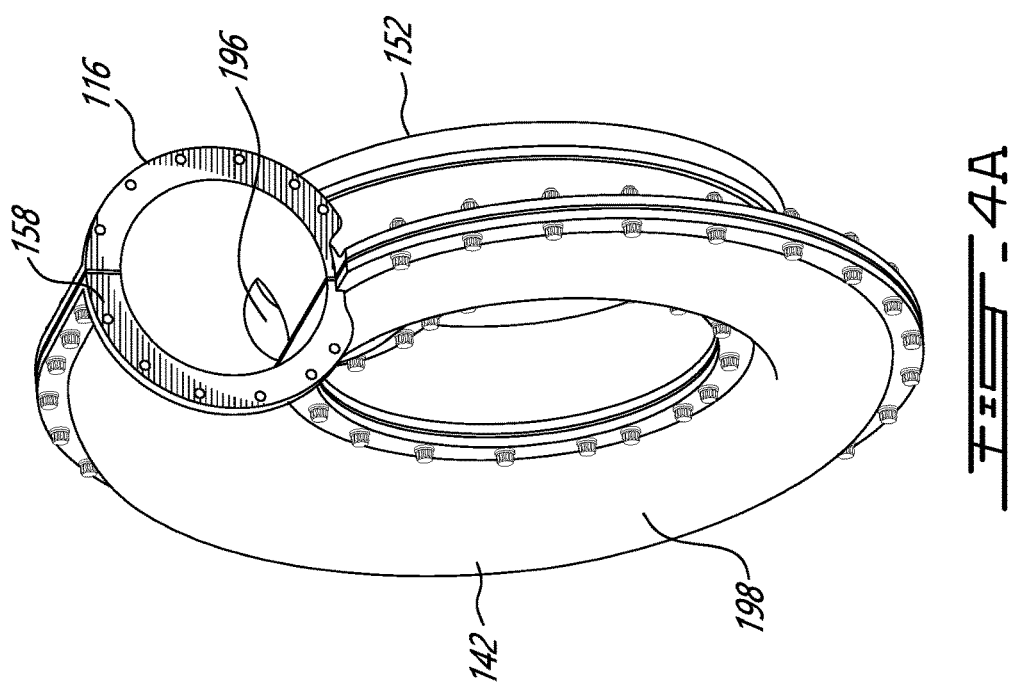
FIG. 4A is an oblique view of a gas turbine intake in accordance with a second embodiment.

FIGS. 4A and 4B present another example embodiment of a gas turbine intake 116. The similarities and differences between the embodiment presented in FIGS. 3A to 3D and the embodiment presented in FIGS. 4A and 4B will now be detailed.

The embodiment presented in FIGS. 4A and 4B also presents a gas turbine intake 116 which has a swirl housing assembly 142 formed of a proximal portion 196 and a distal portion 198 fastened to one another at a joint. The swirl housing assembly 148 having an inlet 158 for fluidly connecting an exhaust conduit, an annular outlet 152 defined around a central axis for fluidly connecting a turbine gas path, and a swirl path extending circumferentially around the central axis from the tangential inlet. The gas turbine intake 116 also has a plurality of vanes 156 located in the swirl housing assembly 142, the vanes 156 circumferentially interspaced from one another relative the central axis. The vanes 156 each have a twisted and flat body, having a length extending from a leading end to a trailing end, the leading end being oriented mainly circumferentially and axially at the swirl path, the trailing end being oriented mainly axially and radially at the annular outlet 152. The twisted and flat body twists between the leading end and the trailing end around the central axis, and around a radial axis perpendicular to the central axis.

However, contrary to the gas turbine intake 16 presented in FIG. 3A-3D, the cross-sectional geometry of the gas turbine intake 116 is generally circular rather than generally rectangular (with a rounded edge at the curved portion). Moreover, the swirl path, which extends circumferentially around the central axis, terminates at a distal end 196 opposite the inlet 158, and does not fluidly communicate in a recirculating manner between the distal end 196 and the 158. The geometry of the guide vanes is adjusted accordingly.

FIG. 5 presents yet another embodiment of a gas turbine intake 216 which has a swirl housing 242 formed of a proximal portion 296 and a distal portion 298 fastened to one another at a joint. In this embodiment, the swirl path has a helical geometry and the swirl housing 242 can be entirely devoid of internal vanes.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, other fasteners than bolts can be used, such as rivets for instance. Moreover, in the illustrated embodiment, each one of the portions forms roughly one half of the swirl path, but it will be noted that other proportions can be preferred in alternate embodiments, such as ⅓ being formed by the proximal side and ⅔ being formed by the distal side for instance. Yet further modifications could be implemented by a person of ordinary skill in the art in view of the present disclosure, which modifications would be within the scope of the present technology.

The invention claimed is:

1. An aircraft engine comprising:
an exhaust conduit;
at least one combustion engine having an exhaust gas outlet fluidly connected to the exhaust conduit;
at least one compressor configured to feed compressed air to the at least one combustion engine;
at least one gas turbine having a casing defining a radially outer limit of an annular gas path extending along and around a central axis, and at least one rotor having a shaft concentric to the central axis, a plurality of blades circumferentially interspaced from one another around the central axis and protruding from the shaft across the annular gas path, wherein the at least one combustion engine, the at least one compressor and the at least one gas turbine are arranged in series along the central axis with the at least one compressor positioned in between the at least one combustion engine and the at least one gas turbine; and
a swirl housing assembly defining an intake to the gas turbine, the swirl housing assembly having a tangential inlet fluidly connecting the exhaust conduit to receive a tangentially-directed flow from the tangential inlet, an annular outlet fluidly connecting the annular gas path to direct an axially-directed flow to the annular outlet, a swirl path extending around the central axis and between the tangential inlet and the annular outlet, the swirl housing assembly having vanes interspaced from one another around the central axis, the vanes operable to transition the tangentially-directed flow to the axially-directed flow, the swirl housing assembly having a proximal portion defining a first portion of the swirl path, a distal portion defining a second portion of the swirl path, the proximal portion fastened to the distal portion via a plurality of fasteners, a gasket sandwiched between the proximal portion and the distal portion by the plurality of fasteners, the gasket extending in a radial plane relative the central axis, the proximal portion unfastenable from and separable from the distal portion to provide access to the swirl path.

2. The aircraft engine of claim 1 wherein each vane is secured to a first one of the proximal portion and of the distal portion and extends towards a second one of the proximal portion and of the distal portion.

3. The aircraft engine of claim 1 wherein each vane is integrally cast to a corresponding on of the proximal portion and of the distal portion.

4. The aircraft engine of claim 1 wherein the fasteners are bolts, the bolts being engaged with bores formed in both a flange of the distal portion and a flange of the proximal portion.

5. The aircraft engine of claim 1 wherein the gasket is made of one of a metal and a composite material.

6. The aircraft engine of claim 1 wherein the proximal portion is a proximal half defining a first half of the swirl path and the distal portion is a distal half defining a second half of the swirl path.

7. The aircraft engine of claim 1 wherein the swirl path extends circumferentially and is confined to a radially extending plane.

* * * * *